United States Patent
De Combarieu et al.

(10) Patent No.: US 12,467,590 B2
(45) Date of Patent: Nov. 11, 2025

(54) SEALED AND INSULATING TANK FOR STORING AND/OR TRANSPORTING A LIQUEFIED GAS

(71) Applicant: GAZTRANSPORT ET TECHNIGAZ, Saint-Remy-les-Chevreuse (FR)

(72) Inventors: Guillaume De Combarieu, Saint-Remy-Leschevreuse (FR); Benoît Morel, Saint-Remy-les-Chevreuse (FR); Guillaume Salmon Legagneur, Saint-Remy-les-Chevreuse (FR)

(73) Assignee: GAZTRANSPORT ET TECHNIGAZ, Saint-Remy-les-Chevreuse (FR)

( * ) Notice: Subject to any disclaimer, the term of this patent is extended or adjusted under 35 U.S.C. 154(b) by 33 days.

(21) Appl. No.: 18/702,185

(22) PCT Filed: Sep. 26, 2022

(86) PCT No.: PCT/EP2022/076724
§ 371 (c)(1),
(2) Date: Apr. 17, 2024

(87) PCT Pub. No.: WO2023/066613
PCT Pub. Date: Apr. 27, 2023

(65) Prior Publication Data
US 2025/0237356 A1    Jul. 24, 2025

(30) Foreign Application Priority Data

Oct. 19, 2021 (FR) ........................................ 2111112

(51) Int. Cl.
*F17C 1/04* (2006.01)
*F17C 1/08* (2006.01)
*F17C 13/00* (2006.01)

(52) U.S. Cl.
CPC .............. *F17C 13/001* (2013.01); *F17C 1/08* (2013.01); *F17C 2203/012* (2013.01);
(Continued)

(58) Field of Classification Search
CPC ...... F17C 1/08; F17C 1/12; F17C 3/02; F17C 3/04; F17C 3/08; F17C 13/001;
(Continued)

(56) References Cited

U.S. PATENT DOCUMENTS 2,818,191 A * 12/1957 Arne ........................ F17C 1/08
220/565
3,159,005 A * 12/1964 Reed ..................... F17C 13/001
62/53.2

(Continued)

FOREIGN PATENT DOCUMENTS

| EP | 3686309 A1 | 7/2020 |
| FR | 2349099 A1 | 11/1977 |

(Continued)

OTHER PUBLICATIONS

International Search Report for PCT application No. PCT/EP2022/076724, mailed Feb. 2, 2023.

*Primary Examiner* — Stephen J Castellano
(74) *Attorney, Agent, or Firm* — Notaro, Michalos & Zaccaria P.C.

(57) ABSTRACT

A sealed and insulating tank for storing and/or transporting a liquefied gas has a sealed and self-supporting internal reservoir with an interior surface for contacting the liquefied gas and an outer surface with an insulating barrier covering the outer surface of the internal reservoir. The insulating barrier is fixed to the internal reservoir. An outer sealed membrane covers an outer surface of the insulating barrier, and the outer sealed membrane has a metal sheet provided with bellows or corrugations. The outer sealed membrane is (Continued)

fixed to the insulating barrier or the internal reservoir. An intermediate space between the internal reservoir and the outer sealed membrane contains a gaseous phase under depression in order to press the outer sealed membrane against the outer surface of the insulating barrier.

30 Claims, 7 Drawing Sheets

(52) U.S. Cl.
CPC ............... *F17C 2203/0345* (2013.01); *F17C 2203/0604* (2013.01); *F17C 2203/0619* (2013.01); *F17C 2203/0636* (2013.01); *F17C 2203/0682* (2013.01); *F17C 2205/018* (2013.01); *F17C 2205/0188* (2013.01); *F17C 2221/012* (2013.01); *F17C 2223/0161* (2013.01); *F17C 2223/033* (2013.01); *F17C 2270/0118* (2013.01)

(58) Field of Classification Search
CPC ........ F17C 2203/012; F17C 2203/0375; F17C 2203/0379; F17C 2203/0391; F17C 2203/0619

See application file for complete search history.

(56) References Cited

U.S. PATENT DOCUMENTS

| | | | | |
|---|---|---|---|---|
| 3,695,483 | A | * 10/1972 | Pogorski | ............ B65D 81/3811 |
| | | | | 220/592.27 |
| 4,050,609 | A | 9/1977 | Okamoto | |
| 6,374,761 | B1 | 4/2002 | Dhellemmes | |
| 2007/0028823 | A1* | 2/2007 | Yang | ....................... B63B 25/14 |
| | | | | 114/74 A |
| 2018/0216782 | A1 | 8/2018 | Delanoe | |
| 2021/0301978 | A1 | 9/2021 | Sasi | |

FOREIGN PATENT DOCUMENTS

| | | |
|---|---|---|
| FR | 2798902 A | 3/2001 |
| JP | S52103023 A | 8/1977 |
| JP | S55139597 A | 10/1980 |
| WO | 2017064426 A | 4/2017 |
| WO | 2017174938 A1 | 10/2017 |
| WO | 2020021212 A1 | 1/2020 |

* cited by examiner

[Fig. 1]
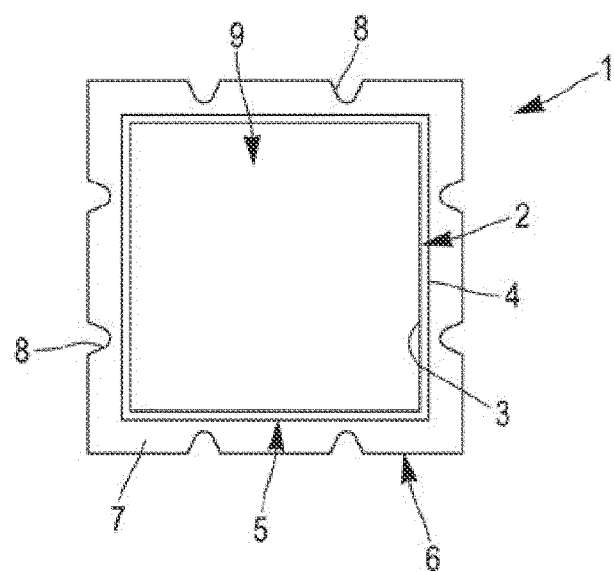
[Fig. 2]
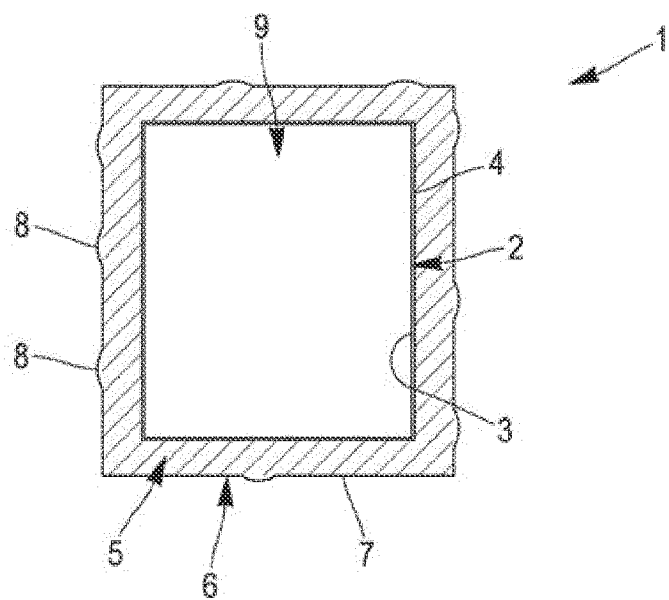

[Fig. 3]
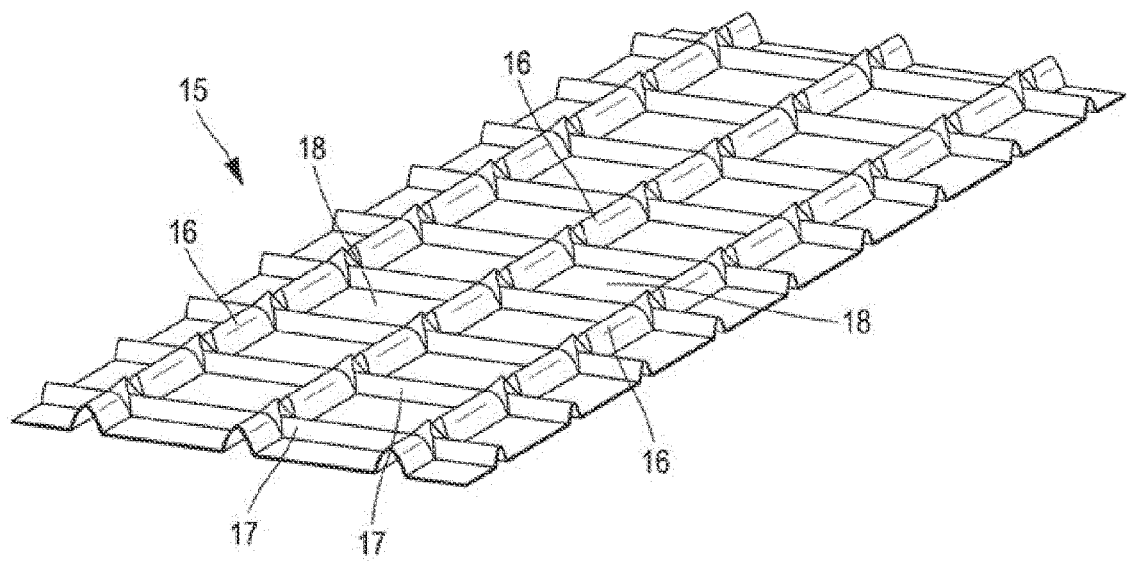
[Fig. 4]
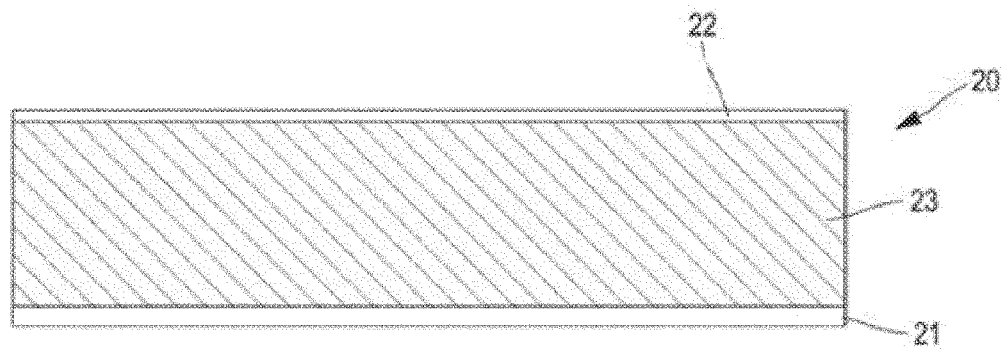

[Fig. 5]
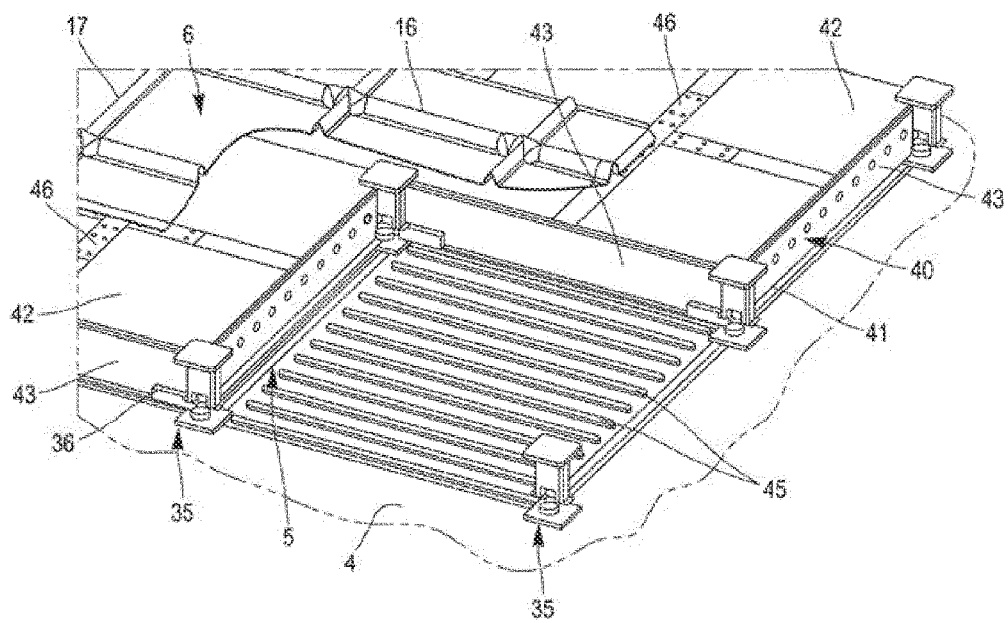
[Fig. 6]
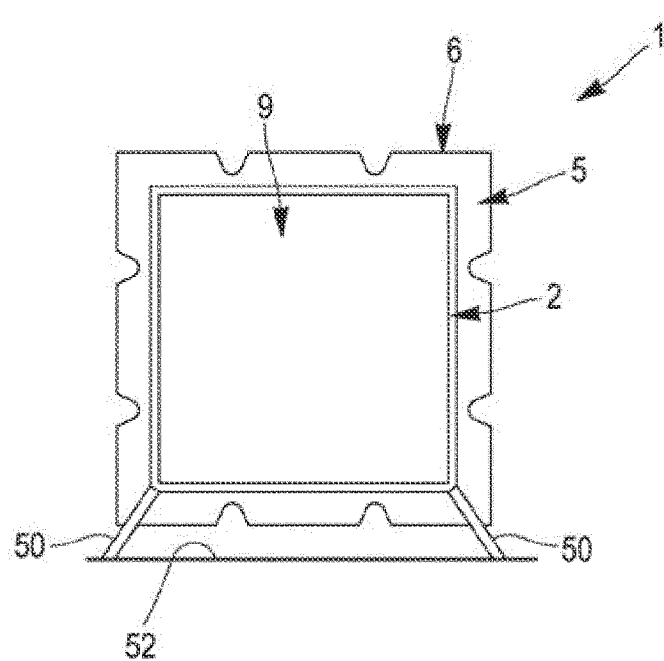

[Fig. 7]
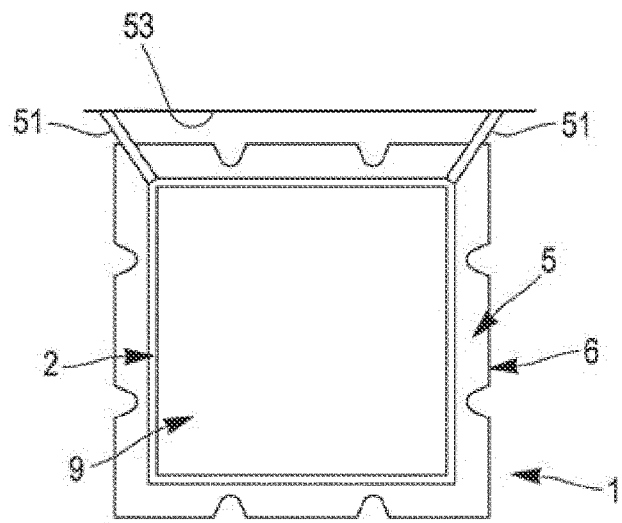
[Fig. 8]
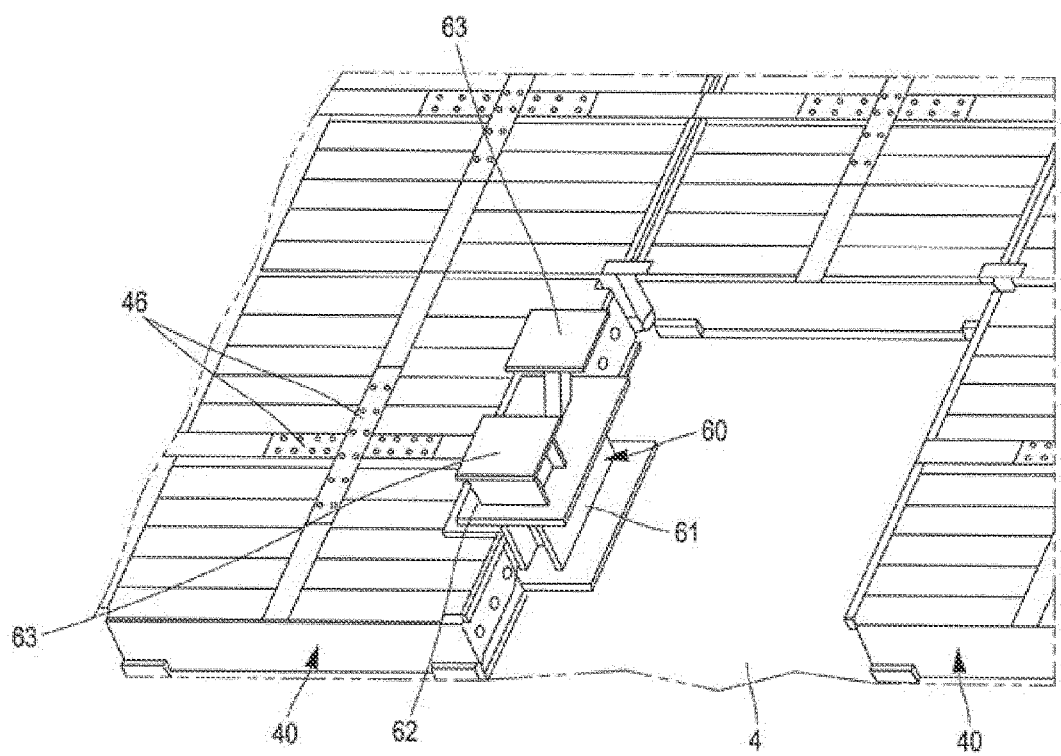

[Fig. 9]
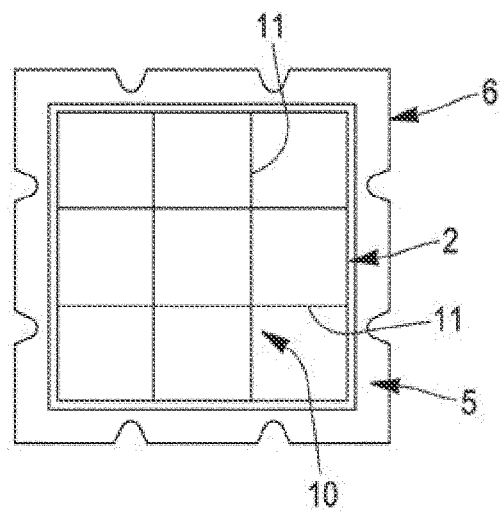
[Fig. 10]
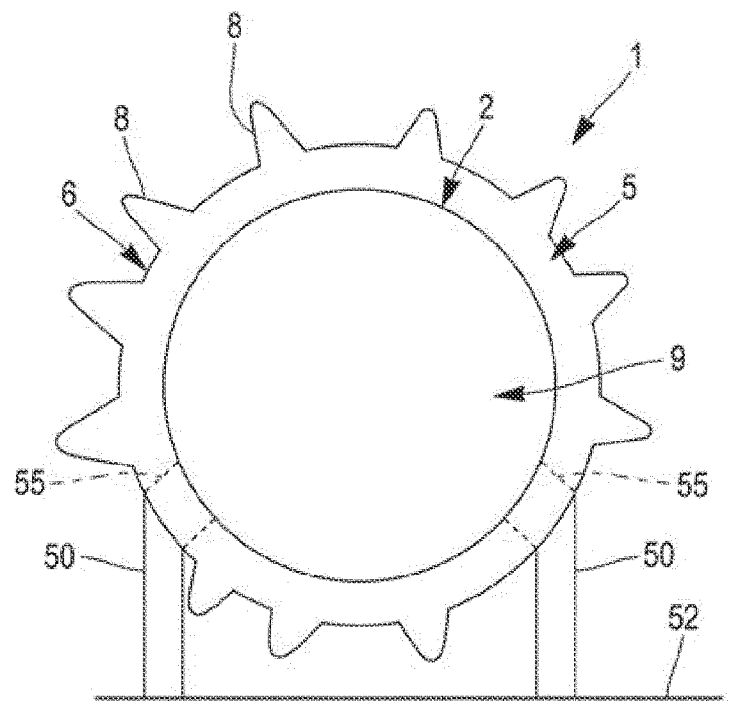

[Fig. 11]
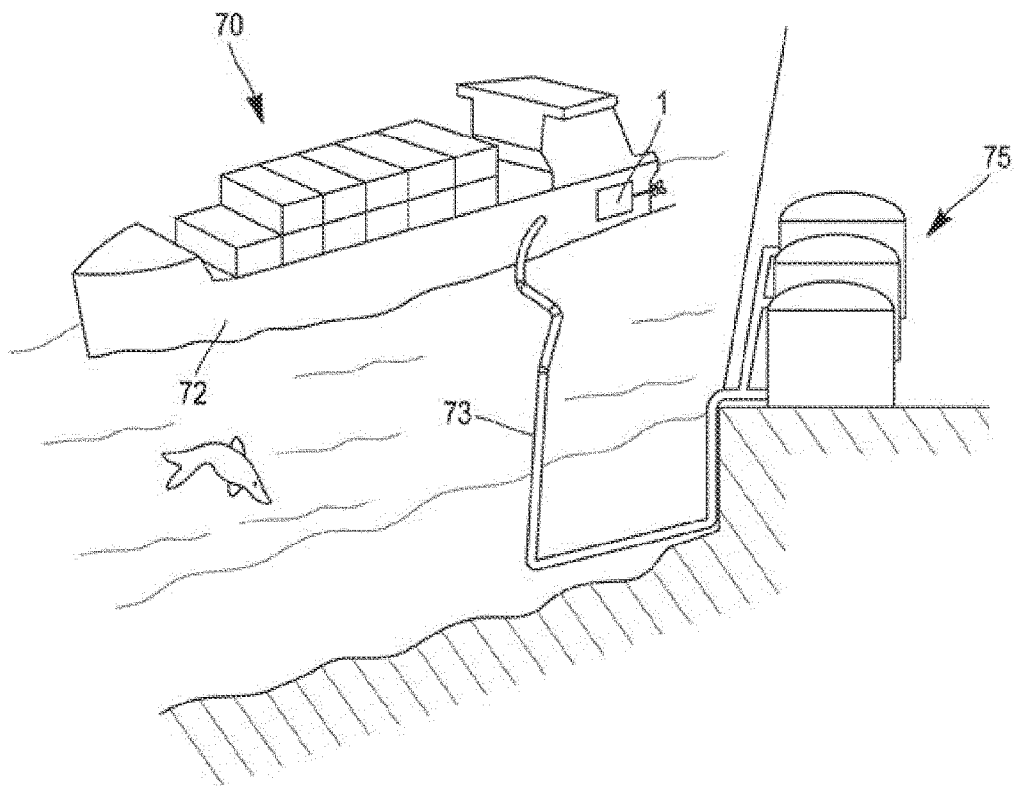
[Fig. 12]
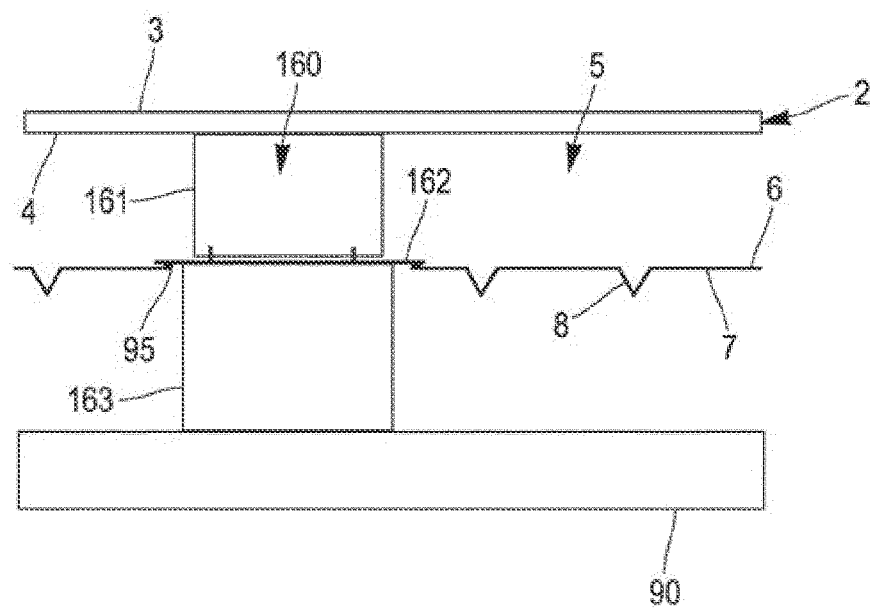

[Fig. 13]
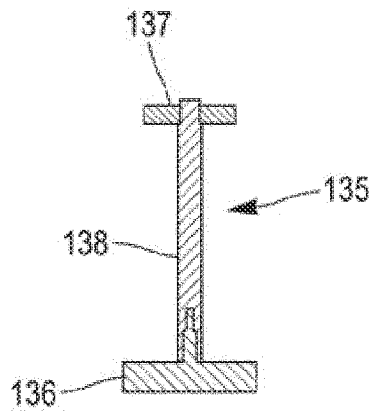
[Fig. 14]
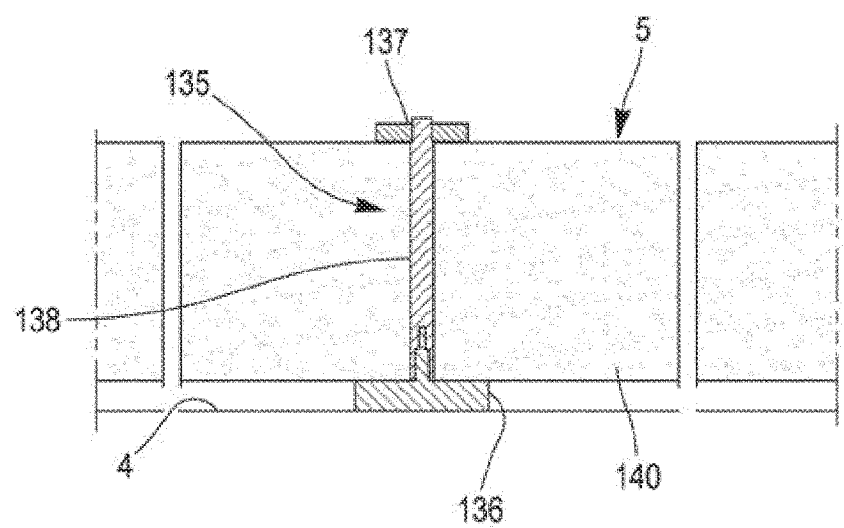
[Fig. 15]
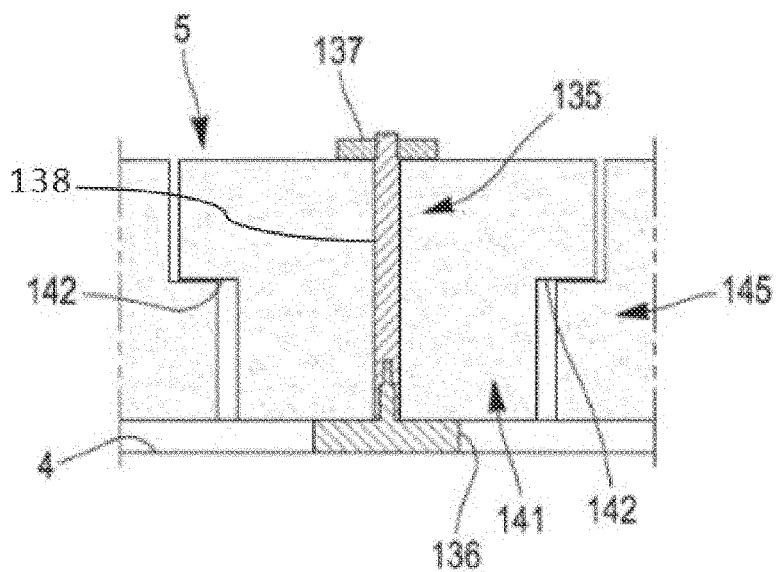

SEALED AND INSULATING TANK FOR STORING AND/OR TRANSPORTING A LIQUEFIED GAS

TECHNICAL FIELD

The invention relates to the field of sealed and thermally insulating tanks. In particular, the invention relates to the field of sealed and thermally insulating tanks for storing and/or transporting liquefied gas at low temperature, such as tanks for transporting liquid hydrogen, which is approximately −253° C. at atmospheric pressure but may also be stored at a higher pressure. These tanks may be installed at a fixed site or on any land or floating vehicle.

PRIOR ART

A fixed liquefied hydrogen storage tank is known in the prior art, from the "Boiler and Pressure Vessel Code" (BPVC) from the American Society of Mechanical Engineers (ASME), which tank comprises two sealed, rigid and self-supporting shells, nested one inside the other. Because the two shells are very thick, the manufacture of a large capacity tank using this technique involves a very high cost of materials and manufacturing difficulties. To be specific, such a tank requires significant human resources for, on the one hand, the manufacture thereof and, on the other hand, to carry out quality control, particularly of the welding points, which greatly increases the cost of manufacturing the tank.

U.S. Pat. No. 4,050,609 discloses a liquefied gas storage tank of spherical shape which successively comprises, from the inside to the outside:
- an internal reservoir, which is sealed and self-supporting, the internal reservoir having an inner surface intended to be in contact with the liquefied gas, and an outer surface,
- an insulating barrier covering the outer surface of the internal reservoir, the insulating barrier being attached to the internal reservoir,
- an outer sealed membrane covering an outer surface of the insulating barrier and attached to the insulating barrier.

As outer sealed membrane, U.S. Pat. No. 4,050,609 uses an aluminum sheet adhesively bonded to a plywood plate of an insulating block, as well as fiberglass fabric connections. However, this outer sealed membrane is fragile and liable to tear at the fiberglass fabric connections covering the studs. It is therefore not possible to envisage placing the insulating barrier under vacuum.

SUMMARY

An idea underlying the invention is to provide a sealed and insulating tank having a double sealing barrier to contain the liquefied gas, which is adapted to offer high thermal insulation performance for the storage of a very cold product, for example liquid dihydrogen at ambient pressure. Another idea underlying the invention is to provide a sealed and insulating tank which can be manufactured at a competitive cost, even with a very large capacity.

To this end, according to an embodiment, the invention provides a sealed and insulating tank for storing and/or transporting a liquefied gas, the tank comprising successively, from the inside to the outside:
- an internal reservoir, which is sealed and self-supporting, the internal reservoir having an inner surface intended to be in contact with the liquefied gas, and an outer surface,
- an insulating barrier covering the outer surface of the internal reservoir, the insulating barrier being attached to the internal reservoir,
- an outer sealed membrane covering an outer surface of the insulating barrier, the outer sealed membrane comprising a piece of sheet metal provided with bellows or corrugations so as to allow elastic deformation, the outer sealed membrane being attached to the insulating barrier or the internal reservoir,
- wherein an intermediate space located between the internal reservoir and the outer sealed membrane contains a gas phase under depression in order to press the outer sealed membrane against the outer surface of the insulating barrier.

By virtue of these features, it is possible to create a more or less high vacuum in the insulating barrier in order to increase the thermal insulation performance of the insulating barrier. In addition, the outer sealed membrane is configured with bellows or corrugations which make it possible to absorb dimensional variations by elastic deformation without the risk of the outer sealed membrane tearing. These dimensional variations can in particular be caused by the thermal contraction of the tank as it cools when it is filled with a cold liquid and by the placing under vacuum of the intermediate space containing the insulating barrier, namely by the compression forces generated by the difference between the atmospheric pressure and the pressure prevailing inside the intermediate space.

Furthermore, because the outer membrane covers a surface of the insulating barrier, the dimensioning of the outer membrane is not dictated by the resistance to the pressure of the cargo, nor by the atmospheric pressure, nor by the depression of the gas phase in the intermediate space. In other words, a very thin membrane may be used. In addition, such a tank makes it possible to reduce the pressure forces experienced by the internal reservoir. In fact, the pressure forces experienced by the internal reservoir are, for example, reduced by 100 kPa compared to the situation which would exist if the atmospheric pressure was not transferred to the outer surface of the internal reservoir.

According to particular embodiments, the sealed and insulating tank has one or more of the features described below, taken in isolation or in any technically possible combination(s).

BRIEF DESCRIPTION OF THE FIGURES

The invention will be better understood, and other aims, details, features and advantages thereof will appear more clearly from the following description of a number of particular embodiments of the invention, provided solely by way of non-limiting illustration, with reference to the attached drawings.

FIG. 1 is a schematic sectional view showing a sealed and insulating tank according to a first embodiment.

FIG. 2 is a view similar to FIG. 1 showing a sealed and insulating tank according to a second embodiment.

FIG. 3 is a perspective view of a corrugated metal plate that may be used as an outer sealed membrane.

FIG. 4 is a schematic sectional view showing an insulating block which may be used to create an insulating barrier.

FIG. 5 is a perspective view, with part removed, of a tank wall according to another embodiment.

FIG. 6 is a view similar to FIG. 1 showing a sealed and insulating tank provided with support legs.

FIG. 7 is a view similar to FIG. 1 showing a sealed and insulating tank provided with hangers.

FIG. 8 is a perspective view, with part removed, of a tank wall according to another embodiment.

FIG. 9 is a view similar to FIG. 1 showing a sealed and insulating tank provided with a lattice of internal stiffeners.

FIG. 10 is a schematic sectional view showing a sealed and insulating tank according to another embodiment.

FIG. 11 is a schematic perspective view of a carrier comprising a sealed and insulating tank as a fuel reservoir.

FIG. 12 is a sectional view of a tank wall fitted with a support leg.

FIG. 13 shows a mechanical coupler which may be used in the tank wall according to an embodiment.

FIG. 14 shows a sectional view of an insulating barrier retained by the mechanical coupler of FIG. 13 according to a first embodiment.

FIG. 15 is a view similar to FIG. 14 according to a second embodiment.

DESCRIPTION OF THE EMBODIMENTS

A number of embodiments of a sealed and insulating tank for the storage and/or transport of a liquefied gas will now be described. In the figures, identical reference numerals designate similar or identical elements.

The sealed and insulating tank may have various shapes, for example a prismatic shape with flat facets, as in most of the figures below, or a spherical shape, or even a cylindrical shape the directrix of which may be circular or polygonal. In the case of a cylindrical tank, the axial ends of the tank may be closed by flat walls or by hemispherical walls. The sealed and insulating tank may also have a bi-lobed shape, or another shape.

As shown for example in FIGS. 1 and 2, the tank 1 successively comprises, from the inside to the outside:
- an internal reservoir 2, which is sealed and self-supporting, the internal reservoir 2 having an inner surface 3 intended to be in contact with the liquefied gas, and an outer surface 4,
- an insulating barrier 5 covering the outer surface 4 of the internal reservoir 2, the insulating barrier 5 being attached to the internal reservoir 2, and
- an outer sealed membrane 6 covering an outer surface 7 of the insulating barrier 5.

The outer sealed membrane 6 comprises a piece of sheet metal provided with bellows or corrugations 8 so as to allow elastic deformation. The outer sealed membrane 6 is attached to the insulating barrier 5.

An intermediate space located between the internal reservoir 2 and the outer sealed membrane 6 contains, in addition to the insulating barrier 5, a gas phase under depression in order to press the outer sealed membrane 6 against the outer surface 7 of the insulating barrier 5.

The internal reservoir 2 is self-supporting and delimits an interior space 9 which directly contains the cargo of liquefied gas. To this end, techniques similar to type C tanks may be used, type C being understood within the meaning of the IGC Code of the International Maritime Organization. However, unlike a type C tank, the internal reservoir 2 has a single wall in the thickness direction, not a double wall.

The internal reservoir 2 may be designed with a capacity that differs widely depending on the requirements of the intended application, for example a capacity of between approximately 103 m$^3$ and 105 m$^3$, or even more.

According to an embodiment, the internal reservoir may comprise a metal shell having a thickness greater than 10 mm, or even greater than 20 mm. Preferably this thickness is less than 50 mm.

The internal reservoir may be manufactured from materials chosen from: non- and low-alloy steels, stainless steels, steel alloys containing nickel with a low coefficient of thermal expansion, for example Invar®, and steel alloys containing manganese with a low coefficient of thermal expansion, aluminum.

Preferably, the internal reservoir is dimensioned to withstand a relative internal pressure greater than 200 kPa, or even greater than 1000 kPa. Such a dimension makes it possible to store the liquefied gas under pressure and therefore to increase the duration of storage without vapor leaks.

To this end, according to an embodiment, internal stiffeners are attached to the inner surface 3 of the internal reservoir 2.

The stiffeners are used to increase the pressure resistance of the internal reservoir 2. They may be produced in different ways. According to an embodiment, the internal stiffeners include protruding ribs on the inner surface 3. According to an embodiment, when the tank is of parallelepiped shape, the ribs in the corners have a structure in the form of an arc of a circle turned toward the inside of the internal reservoir 2.

According to an embodiment, for example shown in FIG. 9, the internal stiffeners comprise rods 11 which extend between opposite sides of said inner surface 3 in such a way as to form a lattice structure 10.

Examples of such a lattice structure 10 are described for example in publication WO-A-2020021212.

Unlike a tank with a rigid double jacket mentioned in the introduction, the outer sealed membrane 6 is not self-supporting and comprises a piece of sheet metal the thickness of which is much thinner than the internal reservoir 2. According to an embodiment, the thickness of the outer sealed membrane 6 is less than 2 mm, for example equal to 1 or 1.5 mm.

The outer sealed membrane 6 may be made of various metals. According to an embodiment, the sheet metal is made of an alloy chosen from non- and low-alloy steels, stainless steels, steel alloys containing nickel with a low coefficient of thermal expansion, and steel alloys containing manganese with a low coefficient of thermal expansion.

In particular, the sheet metal may be made of Invar®, in other words an alloy of iron and nickel with a coefficient of expansion typically between $1.2 \times 10^{-6}$ and $2 \times 10^{-6}$ K$^{-1}$ for an alloy comprising approximately 64% iron and 36% nickel, or an iron alloy with a high manganese content having a coefficient of expansion typically of around 7 to $9 \times 10^{-6}$ K$^{-1}$.

The sheet metal from which the outer sealed membrane 6 is formed is provided with bellows or corrugations 8. These bellows or corrugations 8 may protrude toward the inside of the tank 1 as in FIG. 1, or toward the outside of the tank 1 as in FIG. 2. Bellows or corrugations running alternately in both directions could also be used.

The bellows or corrugations 8 allow elastic deformation of the outer sealed membrane 6. Thus, the outer sealed membrane 6 has a capacity for elastic deformation making it possible to follow movements due in particular to the thermal contraction of the internal reservoir. According to an embodiment, the outer sealed membrane 6 has a capacity for elastic deformation of greater than 0.2%, preferably between 0.2 and 1.8% at ambient temperature in at least one direction perpendicular to the thickness, preferably in any direction perpendicular to the thickness. The capacity for deformation of the outer sealed membrane 6 is calculated on the basis of the deformation of the internal reservoir 2, therefore by multiplying the coefficient of thermal expansion of the internal reservoir 2 by the operational variation in temperature. For example, a capacity for elastic deformation of 0.3% may correspond to the expansion coefficient of steel which is $11 \times 10^{-6}$ mm/mm·K multiplied by 273 K.

To this end, the outer sealed membrane 6 may comprise a series of parallel corrugations or preferably two series of parallel corrugations, the two series having respective intersecting or perpendicular directions in a mid-plane of the sheet metal. A sheet metal plate 15 comprising the two series of corrugations is shown by way of illustration in FIG. 3. The sheet metal plate 15 is for example made of 1.2 mm thick stainless steel. The corrugations may be obtained by bending.

According to this embodiment, the outer sealed membrane 6 is corrugated and comprises a first series of parallel corrugations 16 and flat portions 18 located between the parallel corrugations and resting on the insulating barrier 5, the parallel corrugations 16 being arranged parallel to a first direction.

According to embodiments, the corrugations of the first and/or second series of corrugations may be continuous or discontinuous.

According to this embodiment, the outer sealed membrane 6 further comprises a second series of parallel corrugations 17 and flat portions 18 located between the parallel corrugations 17 and resting on the insulating barrier 5, the parallel corrugations 17 being arranged perpendicular to the first direction.

The outer sealed membrane 6 may be produced over the entire extent necessary by assembling in a sealed manner, by overlap welding, a plurality of sheet metal plates 15. It is thus possible to obtain corrugations which extend continuously from one sheet metal plate to the next over the entire surface covered by the outer sealed membrane 6.

Alternatively, corrugations may be formed discontinuously, for example by stamping. Examples of a metal membrane with discontinuous corrugations may for example be found in publication JPS55139597.

Furthermore, the sheet metal plate 15 is generally flat and suitable for a flat face of a polyhedral tank. It is of course understood that the sheet metal may be curved according to one or more radii of curvature depending on the geometry of the tank wall to be covered, which may be for example spherical or cylindrical. The corrugations 16 and/or 17 may therefore follow curved directrices.

According to an embodiment, the outer sealed membrane 6 has a generally spherical shape and the first direction, corresponding for example to the parallel corrugations 17, is a meridian direction. According to an embodiment, the outer sealed membrane 6 has a generally cylindrical shape and the first direction, corresponding for example to the parallel corrugations 17, is an axial direction. According to an embodiment, the outer sealed membrane 6 has a generally prismatic or parallelepiped shape and the first direction, corresponding for example to the parallel corrugations 17, is a longitudinal direction.

Embodiments of the insulating barrier 5 will be presented below. The insulating barrier 5 is attached to the internal reservoir 2 and the outer sealed membrane 6 is attached to the insulating barrier 5. The insulating barrier 5 is dimensioned to stay under vacuum with a certain degree of deformation, which must not exceed the elastic elongation capacity of the outer sealed membrane 6. The insulating barrier 5 preferably covers the entire outer surface 4 of the internal reservoir 2.

Various structures and materials may be used for this purpose. According to embodiments, the insulating barrier 5 comprises a material chosen from: polymer foam, for example polyurethane, polyvinyl, polypropylene or polyethylene foam, whether or not reinforced with fibers, melamine foam (also called BASOTECT foam); mineral wool, polyester or cellulose wadding, for example glass wool, rock wool, perlite, fumed silica, compacted silica and aerogels.

According to an embodiment, the insulating barrier 5 is made of a material chosen from mineral wool, polyester wadding and cellulose wadding. For example, these materials have a thickness of between 200 and 400 mm, preferably between 200 and 300 mm.

Such insulating materials may be deposited directly on the outer surface 4 of the internal reservoir 2 without prior conditioning. For example, glass wool or polyester wadding or cellulose wadding may be deposited directly on the outer surface 4 of the internal reservoir 2, for example in the form of parallel strips. According to another example, the polymer foam could be polymerized directly in situ over the entire outer surface 4 of the internal reservoir 2.

According to an embodiment, the strips of glass wool or wadding are joined to one another by stitching, for example using glass, composite or plastic threads.

According to an embodiment, the insulating barrier 5 is pre-compressed in the thickness direction between the internal reservoir 2 and the outer sealed membrane 6. This pre-compression may be applied by mechanical couplers described below.

In particular when the insulating barrier 5 is made of compressible materials such as mineral wool, polyester wadding and cellulose wadding, the pre-compression stress makes it possible to better support the outer sealed membrane 6. It is for example between 0.1 MPa and 0.2 MPa.

Pre-compression means a stress which exists before the intermediate space is placed under depression, and which may add additional compression to the insulating barrier 5 via the outer sealed membrane 6.

Modular manufacturing of the insulating barrier 5 may facilitate standardization of the methods for putting in place the insulation.

According to embodiments, the insulating barrier 5 comprises heat-insulating elements juxtaposed on the outer surface 4 of the internal reservoir 2.

In an embodiment, shown for example in FIG. 4, a heat-insulating element 20 comprises:
- a first plate 21 adjacent to the outer surface 4 of the internal reservoir 2,
- a second plate 22 parallel to the first plate 21 and spaced apart from the first plate 21 in a thickness direction of the heat-insulating element 20, the second plate 22 being adjacent to the outer sealed membrane 6, and
- a thermal insulation lining 23 placed between the first plate and the second plate.

This thermal insulation lining comprises, for example, a polymer foam having sufficient relative density to withstand the small compressive force linked to the difference in pressure between the ambient atmosphere and the intermediate space and take into account a safety margin. According to an embodiment, the relative density is between 40 kg/m$^3$ and 90 kg/m$^3$, preferably between 40 kg/m$^3$ and 70 kg/m$^3$, for example equal to 50 kg/m$^3$. It may be, for example, polyurethane, polyvinyl, or polyethylene or polypropylene foam, whether or not reinforced with glass fibers.

The plates 21 and 22 may be made of plywood or a composite. They may be adhesively bonded to the thermal insulation lining 23.

The heat-insulating elements juxtaposed with one another may have inter-panel spaces. It is then necessary to insert seals in the inter-panel spaces to ensure the continuity of the insulating barrier. The seals are, for example, made of glass wool. In other words, in the tank according to the invention, the insulating barrier 5 may exhibit material continuity. Material continuity is ensured by insulating materials, such as thermal insulation lining. The smallest space is filled so that no gaps are left in this barrier. The insulating barrier 5 is thus continuous in all directions, that is to say in the thickness direction of the tank and perpendicular to this direction. This continuity, in directions perpendicular and parallel to the surface of the tank, is at least present on one layer of the insulation.

In an embodiment, a heat-insulating element includes a thermal insulation lining, for example made of the aforementioned materials, arranged in the form of a layer parallel to the outer surface of the internal reservoir. The insulation lining is for example perlite, silica aerogels or mixtures thereof.

In an embodiment, supporting elements rise through the thickness of said thermal insulation lining to absorb forces. In an example applicable to the heat-insulating element 20 shown in FIG. 4, the supporting elements are arranged between the first plate 21 and the second plate 22, and the thermal insulation lining 23 is arranged between the supporting elements. When they are present, the relative density of the thermal insulation lining 23 may be reduced since the supporting elements absorb the forces at least partially.

In another embodiment, for example shown in FIG. 5, the heat-insulating element is produced in the form of a box 40 comprising the first plate 41, the second plate 42 and side plates 43 extending between the first plate 41 and the second plate 42 to enclose an interior space of the box 40. The interior space of the box 40 is filled with said thermal insulation lining.

Since the box 40 takes up the compressive forces, the thermal insulation lining (not shown) may be any non-structural material, for example a powder such as perlite, glass wool or the like.

According to an embodiment, the supporting elements comprise supporting partitions segmenting said interior space into a plurality of compartments filled with the thermal insulation lining and keeping the first plate 41 at a distance from the second plate 42.

Further details on the manufacture of such an insulating barrier may be found in the publication WO-A-2017064426.

The rigid elements of the insulating barrier 5, such as the boxes 40, the supporting elements or the plates 21 and 22 may be made of plywood or composite.

According to an embodiment, the thickness of the insulating barrier is greater than 200 mm, preferably between 200 mm and 800 mm.

Various solutions are possible for attaching the insulating barrier to the internal reservoir.

According to an embodiment, the insulating barrier 5 is attached to the outer surface 4 of the internal reservoir 2 by adhesive bonding, preferably via beads of mastic.

Beads of mastic 45 which may be used to adhesively bond the box 40 to the outer surface 4 are for example shown in FIG. 5. Such beads of mastic also make it possible to compensate for any areas of the outer surface 4 that are not perfectly flat.

According to another embodiment, the outer surface 4 of the internal reservoir 2 bears a plurality of mechanical couplers, and the insulating barrier 5 is attached to the outer surface 4 of the internal reservoir 2 by said mechanical couplers.

Such mechanical couplers may in particular be used with juxtaposed heat-insulating elements. Thus, FIG. 5 depicts mechanical couplers 35 arranged at the corners of the heat-insulating elements 40 and respectively of the boxes 40. Such a mechanical coupler may hold the heat-insulating element in place via one or other of its areas, for example at a bottom plate or a cover plate. Thus, in FIG. 5 the mechanical coupler 35 interacts with a batten 36 resting on the plate 41. Other mechanical couplers may be used, for example the couplers described in FR-A-2798902.

As can be seen for example in FIG. 5, mechanical couplers may be used in combination with adhesive bonding of the insulating barrier 5. It may also be noted that, when mechanical couplers are used, adhesive bonding is not essential. Beads of mastic 45 may be used in order to compensate for defects in flatness of the outer surface 4.

A mechanical coupler 135 according to another embodiment is shown in FIGS. 13 to 15. The mechanical coupler 135 comprises a rod 138 passing through the insulating barrier 5 in the thickness direction of the insulating barrier and an end piece 137 which is attached to one end of the rod 138 opposite the internal reservoir and which bears on an outer surface of the insulating barrier 5. Advantageously, the outer sealed membrane 6 is attached to the end piece 137.

More specifically, the mechanical coupler 135 comprises a rod 138, and a first end piece 136 and a second end piece 137 arranged at both ends of the rod 138. The attachment of the rod 138 to the first and second end pieces 136, 137 is for example carried out by screwing or by clipping.

The mechanical coupler is for example made from metal. To limit thermal conduction, it is preferable to use a non-metal material, for example a composite, in particular for the rod 138.

The first end piece 136 is attached to the outer surface 4 of the internal reservoir 2 and carries the rod 138. For example, the first end piece 136 is made of metal and attached by welding.

The second end piece 137 is attached to the other end of the rod 138 and has a wider section than the rod 138 so as to bear on the insulating barrier 5. Thus, the mechanical coupler 135 may exert pressure on the insulating barrier 5 via the second end piece 137, which comprises for example a plate or a washer. The second end piece 137 is for example made of composite or plastic.

According to another embodiment, the second end piece 137 is made of metal, which also allows the outer sealed membrane 6 to be welded thereon. Thus, the mechanical coupler 135 may be used to hold in place both the insulating barrier 5 and the outer sealed membrane 6.

FIG. 14 shows the interaction of the mechanical coupler 135 with the insulating barrier 5. In this embodiment, the mechanical coupler 135 passes through a heat-insulating element 140 of the insulating barrier 5, which is for example a block of insulating foam or a strip of glass wool or polyester wadding.

FIG. 15 shows the interaction of the mechanical coupler 135 with the insulating barrier 5 in a second embodiment. In this case, the mechanical coupler 135 passes through a heat-insulating element 141 located between two heat-insulating elements 145. The heat-insulating element 141 has, on each side portion, a shoulder 142 pressing on a corresponding protrusion of the adjacent heat-insulating elements 145 in order to press the adjacent heat-insulating elements 145 against the outer surface 4 of the internal reservoir 2.

It goes without saying that the mechanical coupler 135 is present in multiple units arranged appropriately to retain the entire insulating barrier 5 on the internal reservoir 2, for example in the form of parallel rows of couplers or in the form of a grid with a square or rectangular mesh or the like.

According to an embodiment, the mechanical couplers are spaced apart from one another by a spacing of between 0.5 m and 2 m. The mechanical couplers may or may not be used to hold the outer sealed membrane 6 in place. In an embodiment, some of the mechanical couplers perform this function and others do not.

Various possibilities exist for retaining the outer sealed membrane 6 on the insulating barrier 5.

According to an embodiment, a said heat-insulating element carries, on an outer face opposite the internal reservoir, at least one metal part intended to attach the outer sealed membrane on the insulating barrier, by welding on said metal part.

This embodiment is shown for example in FIG. 5 in which metal anchoring strips 46 are attached to the cover plate 42 of the boxes 40.

According to a variant that has not been shown, the anchoring of the outer sealed membrane 6 is carried out using insulating foam pads having a first end attached to the outer surface 4 of the internal reservoir 2. The insulating foam pad comprises a metal plate on a second end, opposite the first end, the metal plate being intended to attach the outer sealed membrane 6. For example, protruding threaded rods are welded to the outer surface 4 of the internal reservoir 2 and the insulating foam pads are attached to the threaded rods, for example by screwing into a threaded hole of complementary shape.

As stated, the insulating barrier 5 is located in an intermediate space which is sealingly enclosed between the internal reservoir 2 and the outer sealed membrane 6 and which contains a gas phase under depression. This depression, in other words a partial vacuum, makes it possible to lower the heat transfer in the insulating barrier 5 and to increase the thermal insulation performance.

According to an embodiment, the gas phase under depression has an absolute pressure of less than 1 kPa (10 mbar), preferably 0.1 kPa (1 mbar) at a temperature of 15° C.

The depression of the gas phase may for example cause the outer sealed membrane 6 to exert additional compression of approximately 0.1 MPa on the insulating barrier 5.

Because it is thin, the outer sealed membrane 6 should not be used to support or suspend the tank 1.

Thus, according to an embodiment, the tank 1 comprises a support system intended to support the tank in an installation, the support system comprising at least one support element having an internal portion attached to the internal reservoir 2 and an external portion extending outside the outer sealed membrane 6, said support element extending through a thickness of the insulating barrier 5 and passing sealingly through the outer sealed membrane 6.

According to an embodiment, shown for example in FIG. 6, a said support element 50 is attached to a lower portion of the internal reservoir 2, and the tank 1 is borne by said support element 50. Thus, the installation is for example a floor wall 52 above which the tank 1 is supported via one or more support elements 50.

According to an embodiment, shown for example in FIG. 7, a said support element 51 is attached to an upper portion of the internal reservoir 2, and the tank 1 is suspended by said support element 51. Thus, the installation is for example a ceiling wall 53 under which the tank 1 is suspended via one or more support elements 51.

Apart from the positions shown in FIGS. 6 and 7, similar support elements may be positioned at any suitable location on the internal reservoir 2. Thus, the tank 1 could also be attached to vertical walls by supports extending horizontally from one or more lateral sides of the internal reservoir 2.

FIG. 8 shows an embodiment of a support leg 60 which may be used to produce the support element 50 or 51. The support leg 60 comprises a base 61 attached, for example welded, to the outer surface 4 between the heat-insulating elements creating the insulating barrier 5, which are in this case boxes 40. The base 61 extends through the thickness of the insulating barrier 5 from the outer surface 4 to the height of the outer sealed membrane 6. The base 61 carries a metal sealing plate 62, which allows the entire contour of an opening made in the outer sealed membrane 6 (not shown) to be sealingly welded. According to a variant, the base 61 is formed from an insulating material capable of supporting the metal sealing plate 62, for example made of wood or fiberglass composite. This embodiment is advantageous in that it makes it possible to reduce thermal bridges that might impair the quality of the thermal insulation.

The metal sealing plate 62 carries one or more legs 63 protruding beyond the outer sealed membrane 6 and making it possible to interact with the floor wall 52 or ceiling wall 53, depending on the location of the support leg 60 on the internal reservoir 2. Further details on the manufacture of such a support leg may be found in publication WO-A-2017174938.

FIG. 12 shows another embodiment of a support system. The support system is a support leg 160 comprising a first internal part 161 and a second external part 163, and a metal sealing plate 162 arranged between them. The first internal part 161 is located between the outer surface 4 of the internal reservoir 2 and the inner surface of the sealed membrane 6. The second external part 163 extends from the outer surface 7 of the insulating membrane 6 as far as an external support 90, for example a floor. The first part 161 is for example a wooden or fiberglass wedge attached to the internal reservoir 2 and extending as far as the outer sealed membrane 6. The internal reservoir 2 rests on the first part 161. Thus, this first part makes it possible in particular to limit thermal bridges through the insulating barrier 5. The second part 163 is a support, for example made of metal, positioned facing the first part. Thus, the support leg 160 makes it possible to support the weight or part of the weight of the tank without crushing or deforming the insulation of the insulating barrier 5. The number of support legs as well as the dimensions of the first part 161 and the second part 163 will be chosen with regard to the shape and weight of the tank. When a plurality of support legs 160 are necessary, they may have dimensions that are identical or different to one another. A metal part may be interposed between the part 161 and the shell 2 to better support the weight of the shell 2; this has not been shown.

FIG. 12 also shows welding zones 95 for connecting the outer sealed membrane 6 to the metal sealing plate 162.

As stated, the tank 1 may have various shapes. A spherical tank is shown schematically in FIG. 10. The portion 55 of the support elements 50 has been shown in broken lines to make it clear that they pass through the thickness of the insulating barrier 5, as already described.

Such a tank may be used to store various liquefied gases, for example liquefied natural gas, liquefied petroleum gas, ammonia. Preferably, the sealed and insulating tank is intended to contain dihydrogen.

Such a tank may form part of an onshore storage facility, for example for storing hydrogen or LNG, or may be installed on a floating structure, coastal or deep-water, in particular an LNG carrier, a floating storage and regasification unit (FSRU), a remote floating production and storage unit (FPSO), and the like. According to an embodiment, the onshore storage facility is intended to supply gas to an electrical or thermal energy production device in order for example to supply a city with electricity or heat, or a network in order for example to supply a city with natural gas.

In particular, in a land, air or marine vehicle, comprising a propulsion or energy production device, the sealed and insulating tank 1 may serve as a fuel reservoir for the propulsion or energy production device, as shown in FIG. 11 with reference to a carrier 70.

According to an embodiment, a transfer system for a liquefied gas fuel includes the abovementioned vehicle, insulated pipelines arranged so as to connect the fuel reservoir of the vehicle to a floating or onshore storage facility, and a pump for pumping a flow of liquefied gas fuel through the insulated pipelines from the floating or onshore storage facility to the fuel reservoir.

In a method for loading such a vehicle as described above, a liquefied gas fuel is conveyed through insulated pipelines from a floating or onshore storage facility to the fuel reservoir of the vehicle.

For example, with reference to FIG. 11, the carrier 70 includes the sealed and insulating tank 1, for example of generally prismatic shape, mounted in the hull 72 of the carrier.

In a manner known per se, loading/unloading pipelines arranged on the upper deck of the carrier may be connected, by means of transfer lines 73, to a port terminal 75 to transfer a cargo of liquefied gas fuel to the tank 1.

To generate the pressure necessary for the transfer of the liquefied gas, pumps on board the carrier 70 and/or pumps fitted to the port terminal 75 are used.

Although the invention has been described in connection with several particular embodiments, it is obvious that it is in no way limited thereto and that it includes all technical equivalents of the means described as well as combinations thereof, if these fall within the scope of the invention.

The use of the verb "comprise" or "include" and conjugated forms thereof does not rule out the presence of other elements or other steps in addition to those stated in a claim.

In the claims, any reference sign in parentheses should not be interpreted as a limitation of the claim.

The invention claimed is:

1. A sealed and insulating tank for storing and/or transporting a liquefied gas, the tank comprising successively, from the inside to the outside:
   an internal reservoir, which is sealed and self-supporting, the internal reservoir having an inner surface for contacting the liquefied gas, and an outer surface,
   an insulating barrier covering the outer surface of the internal reservoir, the insulating barrier being attached to the internal reservoir,
   an outer sealed membrane covering an outer surface of the insulating barrier, the outer sealed membrane comprising a piece of sheet metal provided with bellows or corrugations so as to allow elastic deformation, the outer sealed membrane being attached to the insulating barrier or the internal reservoir, and
   wherein an intermediate space located between the internal reservoir and the outer sealed membrane contains a gas phase under depression in order to press the outer sealed membrane against the outer surface of the insulating barrier, wherein the depression consists of a difference between the pressure prevailing inside the intermediate space and the atmospheric pressure.

2. The sealed and insulating tank as claimed in claim 1, wherein the internal reservoir comprises a metal shell having a thickness greater than 10 mm.

3. The sealed and insulating tank as claimed in claim 1, wherein the internal reservoir is manufactured from materials chosen from: non- and low-alloy steels, stainless steels, steel alloys containing nickel with a low coefficient of thermal expansion, steel alloys containing manganese with a low coefficient of thermal expansion, and aluminum.

4. The sealed and insulating tank as claimed in claim 1, comprising internal stiffeners attached to the inner surface of the internal reservoir.

5. The sealed and insulating tank as claimed in claim 4, wherein the internal stiffeners include protruding ribs on the inner surface.

6. The sealed and insulating tank as claimed in claim 1, wherein the internal reservoir is dimensioned to withstand a relative internal pressure greater than 200 kPa.

7. The sealed and insulating tank as claimed in claim 1, the tank further comprising a support system for supporting the tank in an installation, the support system comprising at least one support element having an internal portion attached to the internal reservoir and an external portion extending outside the outer sealed membrane, said support element extending through a thickness of the insulating barrier and passing sealingly through the outer sealed membrane.

8. The sealed and insulating tank as claimed in claim 7, wherein a support element is attached to a lower portion of the internal reservoir, and wherein the tank is borne by said support element.

9. The sealed and insulating tank as claimed in claim 7, wherein a support element is attached to an upper portion of the internal reservoir, and wherein the tank is suspended by said support element.

10. The sealed and insulating tank as claimed in claim 1, wherein the insulating barrier comprises a material chosen from: polymer foam, mineral wool, polyester or cellulose wadding, perlite, fumed silica, compacted silica and aerogels.

11. The sealed and insulating tank as claimed in claim 1, wherein the insulating barrier is made of a material chosen from mineral wool, polyester wadding and cellulose wadding.

12. The sealed and insulating tank as claimed in claim 1, wherein the insulating barrier is pre-compressed in the thickness direction between the internal reservoir and the outer sealed membrane.

13. The sealed and insulating tank as claimed in claim 1, wherein the insulating barrier comprises heat-insulating elements juxtaposed on the outer surface of the internal reservoir.

14. The sealed and insulating tank as claimed in claim 13, wherein at least one of said heat-insulating elements includes a thermal insulation lining arranged in the form of a layer parallel to the outer surface of the internal reservoir.

15. The sealed and insulating tank as claimed in claim 14, wherein at least one of the heat-insulating elements is produced in the form of a box comprising the first plate, the second plate and side plates extending between the first plate and the second plate to enclose an interior space of the box, the interior space of the box being filled with said thermal insulation lining.

16. The sealed and insulating tank as claimed in claim 13, wherein at least one of said heat-insulating elements carries, on an outer face opposite the internal reservoir, at least one metal part for attaching the outer sealed membrane on the insulating barrier, by welding on said metal part.

17. The sealed and insulating tank as claimed in claim 1, wherein the thickness of the insulating barrier is between 200 mm and 800 mm.

18. The sealed and insulating tank as claimed in claim 1, wherein the outer surface of the internal reservoir bears a plurality of mechanical couplers, and wherein the insulating barrier is attached to the outer surface of the internal reservoir by said mechanical couplers.

19. The sealed and insulating tank as claimed in claim 18, wherein at least one of said mechanical couplers comprises a rod passing through the insulating barrier in the thickness direction of the insulating barrier and an end piece which is attached to one end of the rod opposite the internal reservoir and which bears on an outer surface of the insulating barrier.

20. The sealed and insulating tank as claimed in claim 19, wherein the outer sealed membrane is attached to the end piece.

21. The sealed and insulating tank as claimed in claim 1, wherein the thickness of the outer sealed membrane is less than 2 mm.

22. The sealed and insulating tank as claimed in claim 1, wherein the sheet metal is made of an alloy chosen from non- and low-alloy steels, stainless steels, steel alloys containing nickel with a low coefficient of thermal expansion, and steel alloys containing manganese with a low coefficient of thermal expansion.

23. The sealed and insulating tank as claimed in claim 1, wherein the outer sealed membrane is corrugated and comprises a first series of parallel corrugations and portions located between the parallel corrugations and resting on the insulating barrier, the parallel corrugations being arranged parallel to a first direction.

24. The sealed and insulating tank as claimed in claim 23, wherein the outer sealed membrane further comprises a second series of parallel corrugations and flat portions located between the parallel corrugations and resting on the insulating barrier, the parallel corrugations being arranged perpendicular to the first direction.

25. The sealed and insulating tank as claimed in claim 23, wherein the outer sealed membrane has a generally spherical shape and the first direction is a meridian direction, or the outer sealed membrane has a generally cylindrical shape and the first direction is an axial direction, or the outer sealed membrane has a generally parallelepiped shape and the first direction is a longitudinal direction.

26. The sealed and insulating tank as claimed in claim 1, wherein the outer sealed membrane has a capacity for elastic deformation of greater than 0.2%.

27. The sealed and insulating tank as claimed in claim 1, wherein the gas phase under depression has an absolute pressure of less than 1 kPa (10 mbar).

28. An onshore storage facility comprising a sealed and insulating tank as claimed in claim 1.

29. A land, air or marine vehicle, in particular a carrier, comprising a propulsion or energy production device and a sealed and insulating tank as claimed in claim 1 as a fuel reservoir for the propulsion or energy production device.

30. A method for storing and/or transporting dihydrogen, comprising the sealed and insulating tank as claimed in claim 1.

* * * * *